(12) United States Patent
Berke et al.

(10) Patent No.: US 8,190,873 B2
(45) Date of Patent: May 29, 2012

(54) SYSTEM AND METHOD FOR OPTIMIZING PERFORMANCE OF AN INFORMATION HANDLING SYSTEM COMPONENT

(75) Inventors: Stuart Allen Berke, Austin, TX (US); William F. Sauber, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 332 days.

(21) Appl. No.: 12/465,391

(22) Filed: May 13, 2009

(65) Prior Publication Data

US 2010/0293367 A1 Nov. 18, 2010

(51) Int. Cl.
 *G06F 1/24* (2006.01)
(52) U.S. Cl. .................... 713/100; 711/103
(58) Field of Classification Search .............. 711/103; 713/100
 See application file for complete search history.

(56) References Cited

U.S. PATENT DOCUMENTS

| | | | | |
|---|---|---|---|---|
| 3,736,569 A | 5/1973 | Bouricius et al. | .......... | 340/172.5 |
| 4,747,041 A | 5/1988 | Engel et al. | .......... | 364/200 |
| 4,998,024 A | 3/1991 | Kirk et al. | .......... | 307/40 |
| 5,414,860 A | 5/1995 | Canova, Jr. et al. | .......... | 395/750 |
| 5,560,022 A | 9/1996 | Dunstan et al. | .......... | 395/750 |
| 7,043,650 B2 | 5/2006 | Bresniker et al. | .......... | 713/324 |
| 7,080,267 B2 | 7/2006 | Gary et al. | .......... | 713/300 |
| 7,096,349 B1 * | 8/2006 | Hamilton | .......... | 713/1 |
| 7,277,343 B1 * | 10/2007 | So et al. | .......... | 365/211 |
| 7,480,792 B2 * | 1/2009 | Janzen et al. | .......... | 713/1 |
| 7,555,666 B2 | 6/2009 | Brundridge et al. | .......... | 713/340 |
| 2010/0115180 A1 * | 5/2010 | Lee et al. | .......... | 711/103 |

* cited by examiner

*Primary Examiner* — Albert Wang
(74) *Attorney, Agent, or Firm* — Baker Botts L.L.P.

(57) ABSTRACT

Systems and methods for optimizing performance of an information handling system component communicatively coupled to the information handling system are disclosed. An information handling system may include a data gathering module and an operating condition controller module. The data gathering module may be configured to retrieve an operating condition characterization value from the component. That operating condition characterization value may be substantially based on a predetermined characteristic of the component. The operating condition controller module may be configured to modify an operating condition of the component based at least on the retrieved operating condition characterization value.

20 Claims, 3 Drawing Sheets

| PARAMETER ID | PARAMETER 1 | PARAMETER 2 | PARAMETER TYPE |
|---|---|---|---|
| Toperation | 111 | 3 | 001 |
| TSaccuracy | 3 | 1 | 001 |
| VDD | 1.575 | 1.425 | 011 |
| VDDmin | 1.35 | 0.02 | 001 |
| IDD0 | 3140 | 0 | 011 |
| IDD0 | 2041 | 102 | 001 |
| IDD1 | 3510 | 0 | 011 |
| IDD1 | 2282 | 114 | 001 |
| IDD2N | 2210 | 0 | 011 |
| IDD2N | 1437 | 72 | 001 |
| IDD2P(1) | 650 | 0 | 011 |
| IDD2P(1) | 400 | 100 | 010 |
| IDD2P(0) | 650 | 0 | 011 |
| IDD2P(0) | 400 | 100 | 010 |
| IDD2Q | 2230 | 0 | 011 |
| IDD2Q | 1450 | 73 | 001 |
| IDD3N | 3130 | 0 | 011 |
| IDD3N | 2035 | 102 | 001 |
| IDD3P | 2090 | 0 | 011 |
| IDD3P | 1359 | 68 | 001 |
| IDD4R | 4620 | 0 | 011 |
| IDD4R | 3003 | 150 | 001 |
| IDD4W | 4410 | 0 | 011 |
| IDD4W | 2867 | 143 | 001 |
| IDD5B | 5370 | 0 | 011 |
| IDD5B | 3491 | 175 | 001 |
| IDD6 | 650 | 0 | 011 |
| IDD6 | 325 | 100 | 010 |
| IDD6ET | 650 | 0 | 011 |
| IDD6ET | 325 | 100 | 010 |
| IDD7 | 6450 | 0 | 011 |
| IDD7 | 5160 | 250 | 010 |
| IDD7 | 4193 | 210 | 001 |

| PARAMETER ID | PARAMETER 1 | PARAMETER 2 | PARAMETER TYPE |
|---|---|---|---|
| Toperation | 111 | 3 | 001 |
| TSaccuracy | 3 | 1 | 001 |
| VDD | 1.575 | 1.425 | 011 |
| VDDmin | 1.35 | 0.02 | 001 |
| IDD0 | 3140 | 0 | 011 |
| IDD0 | 2041 | 102 | 001 |
| IDD1 | 3510 | 0 | 011 |
| IDD1 | 2282 | 114 | 001 |
| IDD2N | 2210 | 0 | 011 |
| IDD2N | 1437 | 72 | 001 |
| IDD2P(1) | 650 | 0 | 011 |
| IDD2P(1) | 400 | 100 | 010 |
| IDD2P(0) | 650 | 0 | 011 |
| IDD2P(0) | 400 | 100 | 010 |
| IDD2Q | 2230 | 0 | 011 |
| IDD2Q | 1450 | 73 | 001 |
| IDD3N | 3130 | 0 | 011 |
| IDD3N | 2035 | 102 | 001 |
| IDD3P | 2090 | 0 | 011 |
| IDD3P | 1359 | 68 | 001 |
| IDD4R | 4620 | 0 | 011 |
| IDD4R | 3003 | 150 | 001 |
| IDD4W | 4410 | 0 | 011 |
| IDD4W | 2867 | 143 | 001 |
| IDD5B | 5370 | 0 | 011 |
| IDD5B | 3491 | 175 | 001 |
| IDD6 | 650 | 0 | 011 |
| IDD6 | 325 | 100 | 010 |
| IDD6ET | 650 | 0 | 011 |
| IDD6ET | 325 | 100 | 010 |
| IDD7 | 6450 | 0 | 011 |
| IDD7 | 5160 | 250 | 010 |
| IDD7 | 4193 | 210 | 001 |

FIG. 2

SYSTEM AND METHOD FOR OPTIMIZING PERFORMANCE OF AN INFORMATION HANDLING SYSTEM COMPONENT

TECHNICAL FIELD

The present disclosure relates in general to information handling systems, and more particularly to optimizing performance of components of information handling systems.

BACKGROUND

As the value and use of information continues to increase, individuals and businesses seek additional ways to process and store information. One option available to users is information handling systems ("IHSs"). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Increasingly, IHSs need to be designed with greater operational efficiency, both in terms of physical characteristics and data processing. Often, potential efficiencies are limited based on a lack of available data regarding the components of an IHS. Some operational data may be gathered from the component in real time, but such processes are expensive to implement and difficult to manage. In other cases, only worst case or typical operational data may be available. As a result, designers of IHSs are forced to accommodate the absolute limits of a component's operational profile.

SUMMARY

In accordance with the teachings of the present disclosure, the disadvantages and problems associated with optimizing IHS component performance have been substantially reduced or eliminated.

In accordance with one embodiment of the present disclosure, an IHS for optimizing performance of a component communicatively coupled to the IHS is provided. The IHS may include a data gathering module configured to retrieve an operating condition characterization value from the component, and an operating condition controller module communicatively coupled to the data gathering module. The operating condition controller module may be configured to modify an operating condition of the component based at least on the retrieved operating condition characterization value. The operating condition characterization value may be substantially based on a predetermined characteristic of the component.

In accordance with another embodiment of the present disclosure, an IHS component is provided. The IHS component may include a computer-readable medium having stored thereon an operating condition characterization value, the operating condition characterization value capable of being retrieved by a data gathering module of an IHS, wherein the operating condition characterization value is substantially based on a design characteristic of the component.

In accordance with another embodiment of the present disclosure, a method for optimizing performance of a component communicatively coupled to an IHS is provided. The method may include retrieving an operating condition characterization value from the component, and modifying an operating condition of the component based at least on the retrieved operating condition characterization value. The operating condition characterization value may be substantially based on a design characteristic of the component, and the operating condition characterization value may be configured to provide information for optimizing performance.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 illustrates an example of an operating condition characterization value table, in accordance with certain embodiments of the present disclosure;

DETAILED DESCRIPTION

Preferred embodiments and their advantages are best understood by reference to FIGS. 1 through 4, wherein like numbers are used to indicate like and corresponding parts.

For the purposes of this disclosure, an information handling system ("IHS") may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network storage device, or any other suitable device and may vary in size, shape, performance, functionality, and price. The IHS may include memory, one or more processing resources such as a central processing unit (CPU) or hardware or software control logic. Additional component(s) or the IHS may include one or more storage devices, one or more communications ports for communicating with external devices as well as various input and output (I/O) devices, such as a keyboard, a mouse, and a video display. The IHS may also include one or more buses operable to transmit communication between the various hardware component(s).

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 1:
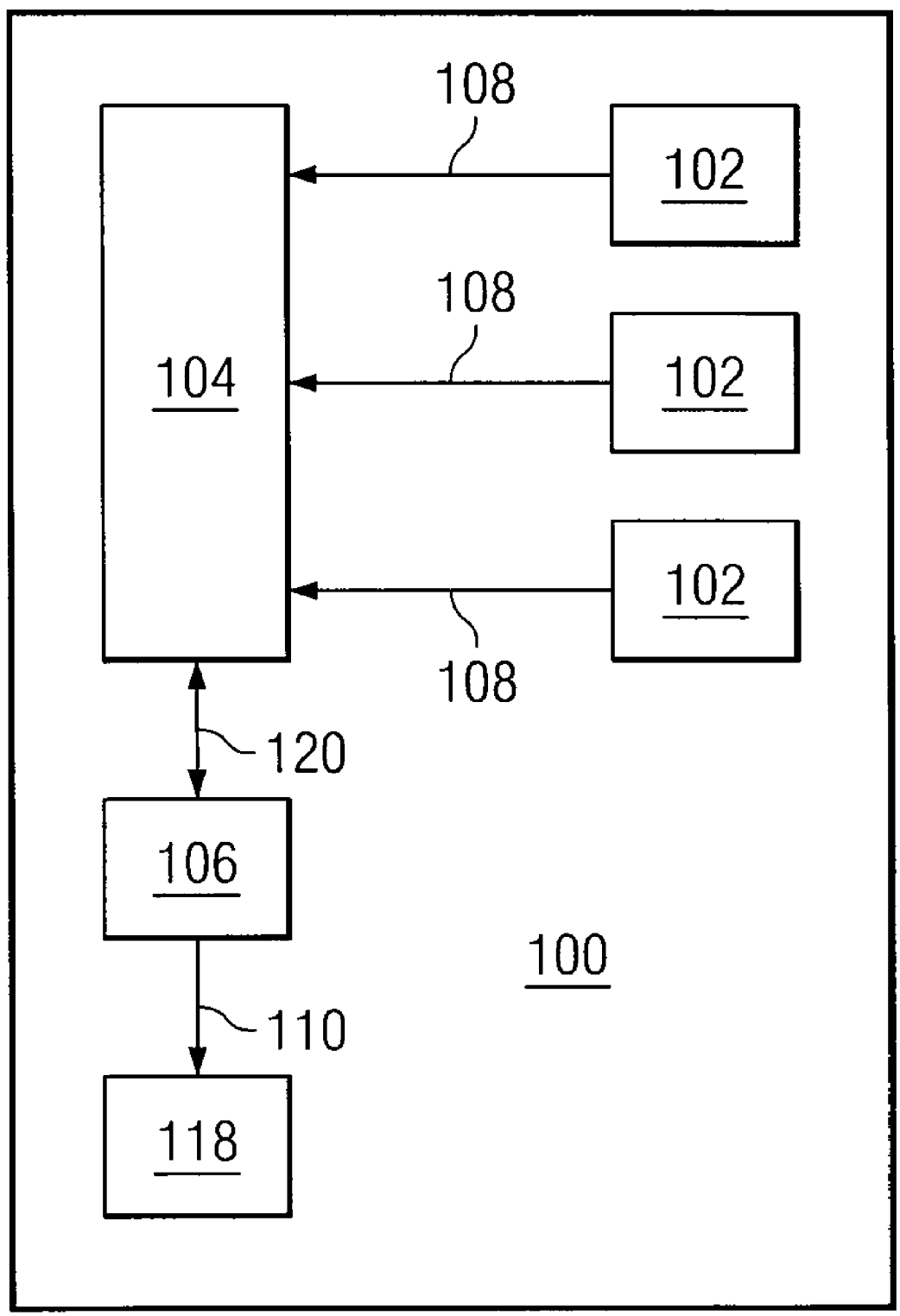
FIG. 1 illustrates an information handling system for optimizing performance of a component communicatively coupled to the information handling system, in accordance with certain embodiments of the present disclosure.

FIG. 1 illustrates an IHS 100 for optimizing performance of a component 102 that is communicatively coupled to, or an integral part of, IHS 100, in accordance with certain embodiments of the present disclosure. IHS 100 may, in some embodiments, include a data gathering module 104 and an operating condition controller module 106 in addition to one or more component(s) 102. Component(s) 102 may be communicatively coupled to data gathering module 104 via communication path 108. Operational condition controller module 106 may be communicatively coupled to data gathering module 104 via communication path 120.

Data gathering module 104 may be configured to retrieve an operating condition characterization value from component(s) 102. The operating condition characterization value may be substantially based on a predetermined characteristic of component(s) 102, as described in more detail below with reference to FIGS. 2-3. Data gathering module 104 may be, in some embodiments, a software program stored on computer-readable media and executable by a processor of IHS 100. For clarity of description FIG. 1 depicts data gathering module 104 as a separate module. In some embodiments, data gathering module 104 may be a stand-alone software program. However, data gathering module 104 may also be a component or subroutine of a larger software program, such as the operating system, or hard-coded into computer-readable media, firmware stored on computer-readable media, and/or any hardware or software module configured to retrieve an operating condition characterization value from component(s) 102.

Operating condition controller module 106 may be configured to modify an operating condition of component(s) 102 based at least on the operating condition characterization value retrieved by data gathering module 104. Operating condition controller module 106 may be, in some embodiments, a software program stored on computer-readable media and executable by a processor of IHS 100. For clarity of description FIG. 1 depicts operating condition controller module 106 as a separate module. In some embodiments, operating condition controller module 106 may be a stand-alone software program. However, operating condition controller module 106 may also be a component or subroutine of a larger software program, such as the operating system, or may be hard-coded into computer-readable media, firmware stored on computer-readable media, and/or any hardware or software module configured to modify an operating condition of component(s) 102 based at least on the retrieved operating condition characterization value.

Component(s) 102 may be configured to store one or more operating condition characterization value(s), as described in more detail below with reference to FIG. 2. Component(s) 102 may be further configured to have one or more operating condition(s) vary in response to a signal from operating condition controller module 106. In some embodiments component(s) 102 may be an IHS memory module such as a Double-Data-Rate Three (DDR3) Synchronous Dynamic Random Access Memory (SDRAM) Dual Inline Memory Module (DIMM). However, component(s) 102 may be any IHS component communicatively coupled to IHS 100, e.g., a hard drive, network interface card (NIC), laptop display monitor, and/or any IHS component configured to store one or more operating condition characterization value(s).

In some embodiments, IHS 100 may also include fan 118. Fan 118 is generally operable to control the operating temperature of component(s) 102 of IHS 100. In operation, data gathering module 104 may retrieve an operating condition characterization value from component(s) 102. The operating condition characterization value may, in some embodiments, be the manufacturer's measured operating temperature range for component(s) 102. For instance, in testing a particular batch of DDR3 SDRAM DIMMs, a memory manufacturer may determine that the DIMM's actual operating temperature range is zero to 95 degrees Celsius, rather than the standard datasheet operating temperature range of zero to 85 degrees Celsius. Data gathering module 104 may communicate the retrieved operating temperature range to operating condition controller module 106. Based on the communicated value, operating condition controller module 106 may control fan 118 to maintain an operating temperature of component(s) 102 between zero and 95 degrees Celsius. In this way, the operating efficiency of IHS 100 is increased as fan 118 may be used less often to maintain component(s) 102 within the determined operating temperature range.

As discussed below with reference to FIGS. 2-3, the operating condition characterization value may be any one of a number of values describing electrical, temperature, data processing, and other characteristics of component(s) 102.

FIG. 2 illustrates an example of an operating condition characterization value table 200, in accordance with certain embodiments of the present disclosure. Table 200 may, in some embodiments, include multiple entries 210. Entry 210 may describe one or more operating condition characterization value(s). In some embodiments, the operating condition characterization value(s) may represent operating temperature, supply voltage, supply current, periodic refresh rate, duty cycle, power consumption, airflow, disk latency, disk seek time, sustained transfer rate, or any other appropriate operating condition of IHS component(s) 102. Further, the operating condition characterization value(s) may be sourced from actual measurements made before or after component 102 has been installed in IHS 100 ("measured values"), information associated with manufacturer's testing ("statistical values"), manufacturer's datasheet or specification information ("datasheet values"), statistical information based on either the component's manufacturing process or industry-wide averages ("industry values"), and/or any other appropriate source.

In the example embodiment, an operating condition characterization value table 200 contains data for a DDR3 SDRAM DIMM. Table 200 includes entries 210 for operating temperature range, supply voltage, and supply current. Table(s) 200 for other types of components may include more, fewer, or different fields, depending on the needs of the particular optimization scheme.

Each entry 210 may include an operating condition description field 202, parameter type code 204, first parameter 206, and second parameter 208. In the example table 200, each entry has defined values for each field. For instance, the first entry 210 describes the operating temperature range for a DDR3 SDRAM DIMM. Operating condition description field 202 contains the text "$T_{OPERATION}$," identifying the particular operating condition characterization value. Parameter type code 204 contains the code "001." In the example embodiment, the code "001" corresponds to a parameter that is the measurement value and accuracy. The parameter type code may be established by the manufacturer of IHS 100 or may be an industry standard. The details of an example parameter type code mapping scheme are described in more detail below with reference to FIG. 3. First parameter 206 contains the value "111," corresponding to the manufacturer's measured value for the operating temperature range. Second parameter 208 contains the value "3," corresponding to the manufacturer's measurement accuracy value for the operating temperature range. FIG. 2 depicts these values and fields as an illustrative example only. Table 200 may contain more, fewer, or different fields depending on the particular implementation and/or component 102.

Other entries 210 of table 200 may include additional operating condition characterization values such as supply voltage "$V_{DD}$" and supply current "$I_{DD}$." Entries 210 may have the same or different data in each field 202, 204, 206, 208 or may not have data populated in a given field 202, 204, 206, 208.

In some embodiments, an operating condition characterization value may be represented by more than one entry 210 in table 200. If IHS 100 gathers an operating condition characterization value from more than one source, e.g., measured values and datasheet values, each operating condition characterization value source may have its own entry 210 in table 200. In the example embodiment, $I_{DD0}$ has an entry 210 with a parameter type code of "011,"corresponding to a datasheet maximum and minimum value, as well as an entry 210 with a parameter type code of "001,"corresponding to measurement value and accuracy values. Parameter type codes are discussed in more detail below with reference to FIG. 3.

In operation, data gathering module 104 of IHS 100 may retrieve the operating condition characterization value data stored in table 200, which may be stored on component 102 communicatively coupled to IHS 100. Data gathering module 104 may then communicate the retrieved operating condition characterization value(s) to operating condition controller module 106 of IHS 100, as described in more detail above with reference to FIG. 1. Based on the communicated operating condition characterization value(s), operating condition controller module 106 may modify (or cease to modify) the operating condition of one or more component(s) 102.

As an illustrative example, operating condition controller module 106 may adjust the supply voltage based on the $V_{DD}$ entry 210 of table 200. Alternatively, if the $V_{DD}$ entry 210 of table 200 indicates that component 102 can operate at a lower supply voltage than what is currently being supplied, operating condition controller module 106 may inform the voltage supply to lower the supply voltage of component 102. Such a change may lower the overall amount of energy consumed by IHS 100, thereby increasing operational efficiencies.

Additionally, IHS 100 may be configured to make changes to an operating condition of component 102 based at least on the type of parameter present in entry 210 of table 200. For instance, if entry 210 is a measured value, then IHS 100 may act more precisely based at least on the retrieved operating condition characterization value, as that value was determined by testing. However, if entry 210 is a statistical value, then IHS 100 may adapt to act differently based on the potentially less precise statistical data. Further, IHS 100 may adapt to act differently based on other types of operating condition characterization data sources, such as industry or datasheet values. An example of the different types of operating condition characterization values are described in more detail below with reference to FIG. 3.

Figure 3:
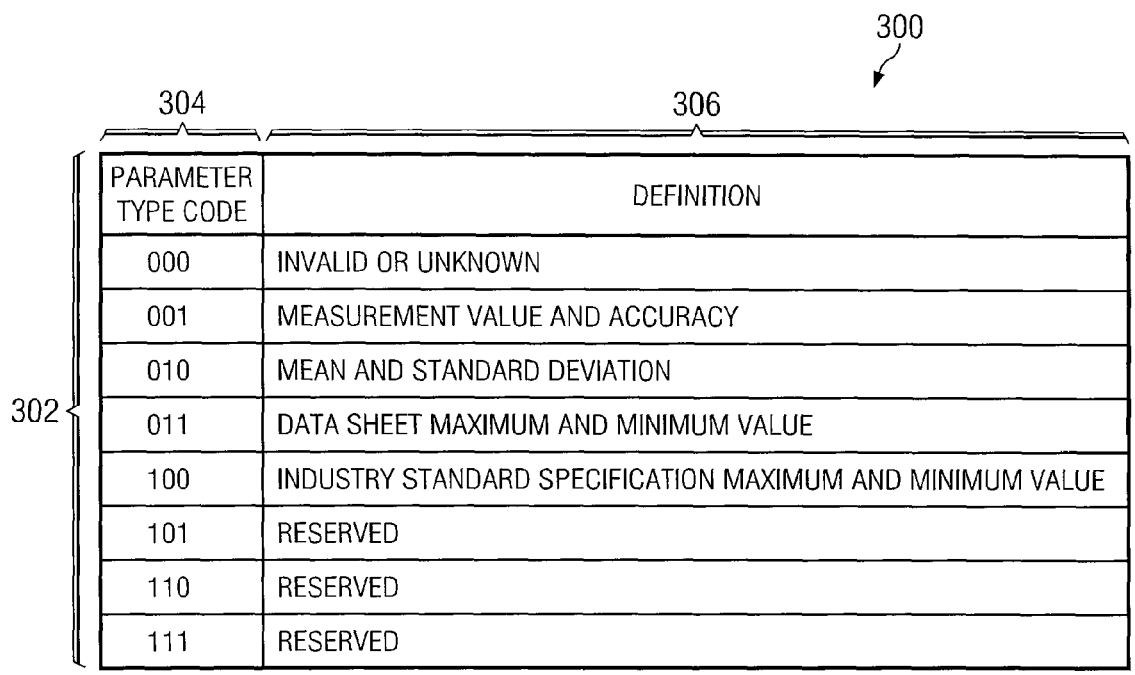
FIG. 3 illustrates an example of a parameter type code mapping table, in accordance with certain embodiments of the present disclosure.

FIG. 3 illustrates an example of a parameter type code mapping table 300, in accordance with certain embodiments of the present disclosure. Table 300 may, in some embodiments, include multiple entries 302. Each entry 302 may provide a mapping of a parameter type code 304 to a source description 306 of an operating condition characterization value. The operating condition characterization value is described in more detail above with reference to FIG. 2.

In some embodiments, parameter type code mapping table 300 maps five different operating condition characterization value types: manufacturer's measurement value and accuracy (measured value), manufacturer's mean and standard deviation values (statistical value), manufacturer's data sheet maximum and minimum value (datasheet value), industry standard specification maximum and minimum value (industry value), and invalid or unknown type. In the example embodiment, code "000" corresponds to invalid or unknown parameter code type, "001" to the measurement value and accuracy, "010" to mean and standard deviation, "011" to data sheet maximum and minimum value, and "100" to industry standard maximum and minimum values. Codes "101," "110,"and "111" are reserved. By providing parameter type code mapping table 300, IHS 100 can determine the source and type of retrieved operating condition characterization value(s). IHS 100 may then modify the operating condition(s) of component(s) 102 depending on the precision of the retrieved operating condition characterization value(s). For instance, statistical values may be generally less precise than measured values. Thus, if a retrieved operating condition characterization value is a measured value, IHS 100 may move more quickly or with less guard-band to adjust component's 102 operating condition based on that value.

In other embodiments, parameter type code mapping table 300 may not appear explicitly. IHS 100 may use another appropriate method to determine the source and type of retrieved operating condition characterization value(s), e.g., parameter type tests and dependent actions embedded in IHS 100.

Figure 4:
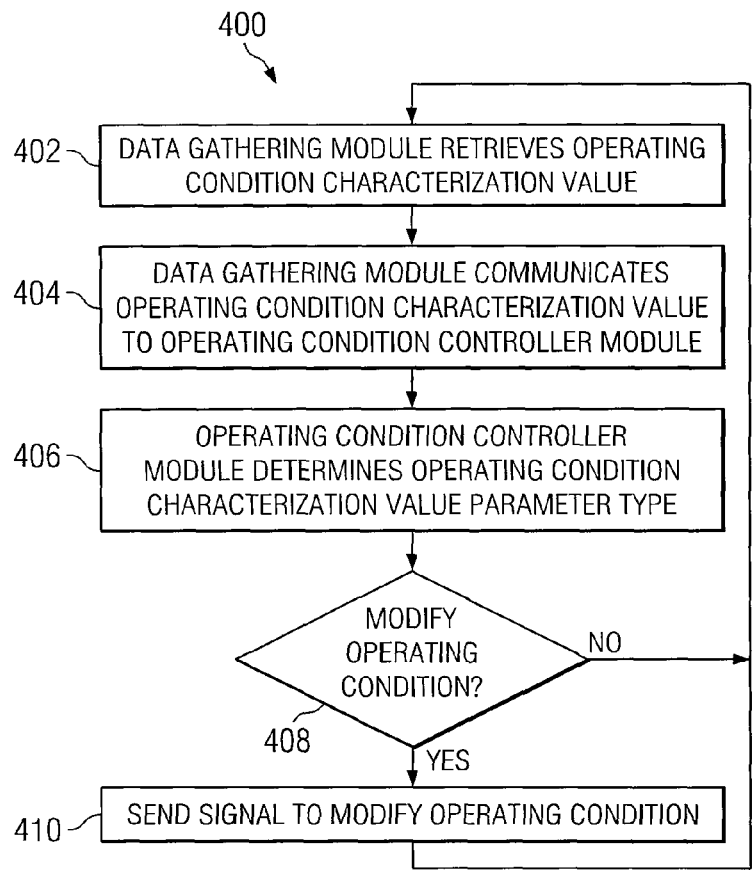
FIG. 4 illustrates a flow chart of an example method for optimizing performance of a component communicatively coupled to an information handling system, in accordance with certain embodiments of the present disclosure.

FIG. 4 illustrates a flow chart of an example method 400 for optimizing performance of component(s) 102 communicatively coupled to, or an integral part of, IHS 100, in accordance with certain embodiments of the present disclosure. Method 400 includes retrieving an operating condition characterization value from component(s) 102 and modifying an operating condition of component(s) 102 based at least on the retrieved operating condition characterization value.

According to one embodiment, method 400 preferably begins at step 402. Teachings of the present disclosure may be implemented in a variety of configurations of IHS 100. As such, the preferred initialization point for method 400 and the order of steps 402-410 comprising method 400 may depend on the implementation chosen. Additionally, method 400 may not be performed for certain operating condition characterization values, e.g., when an operating condition characterization value is represented by an entry 210 in table 200 with a parameter type code of "000" as described in more detail above with reference to FIG. 3.

At step 402, data gathering module 104 of IHS 100 may retrieve an operating condition characterization value from component 102 via communication path 108. The operating condition characterization value is described in more detail above with reference to FIGS. 1-3. At step 404, data gathering module 104 may communicate the retrieved operating condition characterization value to operating condition controller module 106 via communication path 120. At step 406, operating condition controller module 106 may determine what parameter type is associated with the communicated operating condition characterization value, e.g., measured value, statistical value, datasheet value, or industry value. At step 408, operating condition controller module 106 may decide whether, and to what extent, to modify an operating condition of component 102 based at least on the operating condition characterization value.

If operating condition controller module 106 decides to modify an operating condition of component(s) 102, method 400 may proceed to step 410. If no change is desired, method 400 may return to step 402 to examine another operating condition characterization value or source for the same operating characterization value, or method 400 may terminate. At step 410, operating condition controller module 106 may send a signal to component 102 or an operating condition controller intermediary, e.g., a fan or voltage source, in order to effectuate any determined changes in an operating condition of component 102. Following completion of step 410, method 400 may return to step 402 to examine another operating condition characterization value, or method 400 may terminate.

Although FIG. 4 discloses a particular number of steps to be taken with respect to method 400, method 400 may be executed with more or fewer steps than those depicted in FIG. 4. In addition, although FIG. 4 discloses a certain order of steps comprising method 400, the steps comprising method 400 may be completed in any suitable order. For example, in the embodiment of method 400 shown, operating condition controller module 106 determines the extent of a change in an operating condition based on the retrieved parameter type associated with an operating condition characterization value. However, in an IHS 100 in which all components 102 store operating condition characterization values as datasheet values, any analysis of the parameter type code would be unnecessary. Further, a module separate and apart from operating condition controller module 106 may carry out this function if it is desired. Additionally, data gathering module 104 may process multiple operating condition characterization values at one time, and/or pass selected values to operating condition controller module 106.

Using the methods and systems disclosed herein, certain problems associated with optimizing performance of IHS components may be improved, reduced, or eliminated. For example, the methods and systems disclosed herein allow for optimization through component self-reporting of operating condition characterization values.

Although the present disclosure has been described in detail, it should be understood that various changes, substitutions, and alterations can be made hereto without departing from the spirit and the scope of the disclosure as defined by the appended claims.

What is claimed is:

1. An information handling system for optimizing performance of a component communicatively coupled to the information handling system, comprising:
    a data gathering module configured to retrieve:
        an operating condition characterization value from the component, the operating condition characterization value substantially based on a predetermined characteristic of the component; and
        an operating condition characterization value type corresponding to the operating condition characterization value; and
    an operating condition controller module communicatively coupled to the data gathering module, configured to modify an operating condition of the component based at least on the retrieved operating condition characterization value and the operating condition characterization value type.

2. The system of claim 1, wherein the operating condition characterization value comprises manufacturer specification data for the component.

3. The system of claim 1, wherein the operating condition characterization value comprises statistical data about the component.

4. The system of claim 1, wherein the operating condition characterization value comprises manufacturer test data about the component.

5. The system of claim 1, wherein the operating condition characterization value comprises industry standard specification data about the component.

6. The system of claim 1, wherein the modified operating condition of the component comprises an electrical operating condition.

7. The system of claim 1, wherein the modified operating condition of the component comprises a data allocation operating condition.

8. The system of claim 1, wherein the modified operating condition of the component comprises a periodic operating condition.

9. The system of claim 1, wherein the modified operating condition of the component comprises a thermal operating condition.

10. An IHS component, comprising:
    a nonvolatile, computer-readable medium having stored thereon:
        an operating condition characterization value, the operating condition characterization value capable of being retrieved by a data gathering module of an information handling system,
        wherein the operating condition characterization value is substantially based on a predetermined characteristic of the component; and
        an operating condition characterization value type corresponding to the operating condition characterization value.

11. The component of claim 10, wherein the component is a memory component.

12. A method for optimizing performance of a component communicatively coupled to an information handling system, comprising:
    retrieving an operating condition characterization value from the component, the operating condition characterization value substantially based on a predetermined characteristic of the component;
    retrieving an operating condition characterization value type from the component, the operating condition characterization value type corresponding to the operating condition characterization value; and
    modifying an operating condition of the component based at least on the retrieved operating condition characterization value and the operating condition characterization value type.

13. The method of claim 12, wherein the operating condition characterization value comprises manufacturer specification data for the component.

14. The method of claim 12, wherein the operating condition characterization value comprises statistical data about the component.

15. The method of claim 12, wherein the operating condition characterization value comprises manufacturer test data about the component.

16. The method of claim 12, wherein the operating condition characterization value comprises industry standard specification data about the component.

17. The method of claim 13, wherein modifying the operating condition of the component comprises modifying an electrical operating condition.

18. The method of claim 13, wherein modifying the operating condition of the component comprises modifying a data allocation operating condition.

19. The method of claim 13, wherein modifying the operating condition of the component comprises modifying a periodic operating condition.

20. The method of claim 13, wherein modifying the operating condition of the component comprises modifying a thermal operating condition.

* * * * *